(12) United States Patent
Oya

(10) Patent No.: US 11,283,091 B2
(45) Date of Patent: Mar. 22, 2022

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventor: Ryosuke Oya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/773,091

(22) Filed: Jan. 27, 2020

(65) Prior Publication Data

US 2020/0243886 A1    Jul. 30, 2020

(30) Foreign Application Priority Data

Jan. 30, 2019    (JP) .............................. JP2019-013718

(51) Int. Cl.
| | | |
|---|---|---|
| *H01M 8/04* | (2016.01) | |
| *H01M 8/04858* | (2016.01) | |
| *H01M 8/04119* | (2016.01) | |
| *H01M 8/04082* | (2016.01) | |
| *H01M 8/0438* | (2016.01) | |
| *H01M 8/04537* | (2016.01) | |
| *H01M 8/04228* | (2016.01) | |
| *H01M 8/04225* | (2016.01) | |

(52) U.S. Cl.
CPC ... *H01M 8/04947* (2013.01); *H01M 8/04179* (2013.01); *H01M 8/04216* (2013.01); *H01M 8/04228* (2016.02); *H01M 8/04395* (2013.01); *H01M 8/04425* (2013.01); *H01M 8/04567* (2013.01); *H01M 8/04225* (2016.02)

(58) Field of Classification Search
CPC ........... H01M 8/0228; H01M 8/04395; H01M 8/04567; H01M 8/04947
USPC ....................................................... 429/428
See application file for complete search history.

(56) References Cited

U.S. PATENT DOCUMENTS

| | | |
|---|---|---|
| 2010/0266911 A1 | 10/2010 | Aso |
| 2012/0003555 A1* | 1/2012 | Mitsui ................. H01M 8/0494 429/428 |
| 2016/0315338 A1 | 10/2016 | Nada et al. |

FOREIGN PATENT DOCUMENTS

| | | |
|---|---|---|
| JP | 2001-229950 A | 8/2001 |
| JP | 2009-117242 A | 5/2009 |
| JP | 2009-238624 A | 10/2009 |
| JP | 2016-208726 A | 12/2016 |
| JP | 2018-129227 A | 8/2018 |

* cited by examiner

*Primary Examiner* — James M Erwin
(74) *Attorney, Agent, or Firm* — Dickinson Wright, PLLC

(57) ABSTRACT

A fuel cell system includes a fuel cell, auxiliary machinery, a tank, a storage amount detection unit that detects a measured value representing the amount of fuel gas stored in the tank, a secondary battery, a power accumulation amount detection unit that detects an amount of power accumulated in the secondary battery, a feed detection unit, and a control unit. The control unit stops the supply of the fuel gas to the fuel cell when the measured value is less than a threshold value, electrically disconnects the secondary battery from the auxiliary machinery when the amount of accumulated power is less than a lower limit amount of accumulated power, and electrically connects the secondary battery to the auxiliary machinery after the feeding of the fuel gas to the tank is detected.

6 Claims, 7 Drawing Sheets

FUEL CELL SYSTEM AND METHOD OF CONTROLLING FUEL CELL SYSTEM

INCORPORATION BY REFERENCE

The disclosure of Japanese Patent Application No. 2019-013718 filed on Jan. 30, 2019 including the specification, drawings, and abstract is incorporated herein by reference in its entirety.

BACKGROUND

1. Technical Field

The present disclosure relates to a fuel cell system and a method of controlling the fuel cell system.

2. Description of Related Art

There is a fuel cell system including a fuel cell that generates power by receiving a supply of a fuel gas stored in a tank and an oxidant gas taken from outside air, and a secondary battery that accumulates part of the power generated by the fuel cell and functions as a power source together with the fuel cell. In such a fuel cell system, when a gas running-out occurs in which an amount of the fuel gas stored in the tank is less than a predetermined lower limit amount, power accumulated in the secondary battery may be used. For example, in Japanese Unexamined Patent Application Publication No. 2009-117242, when gas running-out occurs, a fuel cell system drives a compressor that is one of auxiliary machines, and executes scavenging processing of the fuel cell by using power from a secondary battery so as to stop an operation of the fuel cell system.

SUMMARY

However, in the fuel cell system as described above, if the power in the secondary battery was reduced when the gas running-out occurred, and the power of the secondary battery was insufficient for driving auxiliary machinery even after the fuel gas was fed to the tank, and the operation of the fuel cell could not be resumed.

A technology disclosed in the present disclosure can be implemented as below aspects.

A first aspect of the present disclosure is a fuel cell system. The fuel cell system includes a fuel cell configured to generate power by receiving a supply of a fuel gas and an oxidant gas, auxiliary machinery used for an operation of the fuel cell, a tank configured to store the fuel gas, supply the stored fuel gas to the fuel cell through a supply pipe and receive the fuel gas fed through a feed pipe, a storage amount detection unit configured to detect a measured value representing an amount of the fuel gas stored in the tank, a secondary battery configured to supply power to the auxiliary machinery, a power accumulation amount detection unit configured to detect an amount of power accumulated in the secondary battery, a feed detection unit configured to detect feeding of the fuel gas to the tank through the feed pipe, and a control unit configured to control the operation of the fuel cell and the supply of the power from the secondary battery to the auxiliary machinery. The control unit is configured to, when the measured value detected by the storage amount detection unit is less than a threshold value corresponding to a predetermined lower limit amount of the fuel gas stored in the tank, execute stop processing of stopping the supply of the fuel gas from the tank to the fuel cell, when the stop processing is executed and the amount of power accumulated in the secondary battery is less than a predetermined lower limit amount of accumulated power, execute disconnection processing of electrically disconnecting the secondary battery from the auxiliary machinery, and, after the disconnection processing is executed and the feeding of the fuel gas to the tank is detected by the feed detection unit, execute connection processing of electrically connecting the secondary battery to the auxiliary machinery.

With the fuel cell system according to the above aspect, when the amount of the fuel gas stored in the tank is less than the lower limit stored amount and the amount of power accumulated in the secondary battery is less than the lower limit accumulated power amount, the secondary battery is electrically disconnected from the auxiliary machinery. Therefore, it is possible to prevent a situation from occurring in which the power in the secondary battery for starting the operation of the fuel cell after the fuel gas is fed to the tank is insufficient due to electrical consumption of the auxiliary machinery. Further, after the disconnection processing is executed and the feeding of the fuel gas to the tank is detected, the secondary battery is electrically connected to the auxiliary machinery again by the connection processing. Therefore, it is possible to prevent a situation from occurring in which the operation of the fuel cell cannot be started while the secondary battery remains electrically disconnected from the auxiliary machinery even though the fuel gas has been fed to the tank. In addition, when the amount of the fuel gas stored in the tank is less than the lower limit stored amount, the operation of the fuel cell is stopped by the stop processing. Therefore, it is possible to prevent a malfunction from occurring, which is caused by continuation of the operation of the fuel cell while the supplied amount of the fuel gas remains insufficient.

In the first aspect, the fuel cell system may further include a pressure detection unit configured to detect the pressure of the fuel gas flowing out from the tank to the supply pipe. The pressure detection unit is provided in the supply pipe. The auxiliary machinery may include a main stop valve configured to control outflow of the fuel gas from the tank to the supply pipe by opening and closing under control of the control unit. The main stop valve is provided in the supply pipe. The storage amount detection unit may acquire, as the measured value, the pressure of the fuel gas detected by the pressure detection unit. The stop processing may be processing of stopping the supply of the fuel gas to the fuel cell by closing the main stop valve when the pressure of the fuel gas acquired by the storage amount detection unit is less than a predetermined lower limit pressure, which is the threshold value.

With the fuel cell system according to the above aspect, since the main stop valve is closed when the pressure of the fuel gas in the tank is reduced, it is possible to prevent the pressure in the tank from being further reduced. Therefore, it is possible to prevent a situation from occurring in which the pressure in the tank is excessively reduced and the tank deteriorates. Moreover, after the operation of the fuel cell is stopped due to gas running-out and the feeding of the fuel gas to the tank is detected, the secondary battery is electrically connected to the auxiliary machinery, and the main stop valve can be opened, such that the operation of the fuel cell can be resumed. Therefore, it is possible to prevent a situation from occurring in which the operation of the fuel cell cannot be resumed because the main stop valve remains closed after the feeding of the fuel gas.

In the first aspect, after the execution of the stop processing, the control unit may execute confirmation processing of re-determining, for the number of predetermined times, whether to execute the stop processing by opening the main stop valve in response to an operation of a user and detecting the pressure of the fuel gas again by the pressure detection unit.

With the fuel cell system according to the above aspect, the confirmation processing is executed in response to the user's operation, and the pressure of the fuel gas in the tank is detected again. Therefore, it is possible to prevent a situation from occurring in which the main stop valve is closed due to erroneous detection of the pressure of the fuel gas and the operation of the fuel cell is stopped. In addition, the number of times that the confirmation processing is executed is limited. Therefore, it is possible to prevent a situation from occurring in which the main stop valve is repeatedly opened and closed due to repeated confirmation processing, which causes the power in the secondary battery to run out and the main stop valve is not opened even after the fuel gas has been fed, and consequently the operation of the fuel cell cannot be resumed.

In the first aspect, when the measured value detected by the storage amount detection unit is less than a predetermined allowable value after the connection processing greater than the predetermined threshold value, the control unit may prohibit the operation of the fuel cell and electrically disconnect the secondary battery from the auxiliary machinery.

With the fuel cell system according to the above aspect, it possible to prevent a situation from occurring in which the operation of the fuel cell is resumed while the amount of the fuel gas fed to the tank is insufficient. Therefore, it possible to prevent a situation from occurring in which the fuel cell is operated while the amount of the fuel gas supplied to the fuel cell is insufficient. In addition, it is possible to prevent a situation from occurring in which the gas running-out that lacks the fuel gas in a short time occurs, the operation of the fuel cell is stopped again, and as a result, the amount of power accumulated in the secondary battery is reduced.

In the first aspect, when the amount of power accumulated in the secondary battery is less than a predetermined threshold value of the amount of accumulated power, which is less than the lower limit amount of accumulated power, after the connection processing, the control unit may prohibit the operation of the fuel cell and electrically disconnect the secondary battery from the auxiliary machinery again.

With the fuel cell system according to the above aspect, it possible to prevent a situation from occurring in which the operation of the fuel cell is resumed while the lower limit amount of power accumulated in the secondary battery needed for the operation of the fuel cell is not secured.

A second aspect of the present disclosure is a method of controlling a fuel cell system. The fuel cell system includes a fuel cell configured to generate power by receiving a supply of a fuel gas stored in a tank, and a secondary battery configured to supply power to auxiliary machinery used for an operation of the fuel cell. The method includes a step of detecting a measured value representing an amount of the fuel gas stored in the tank, a step of detecting an amount of power accumulated in the secondary battery, a step of executing stop processing of stopping the supply of the fuel gas to the fuel cell when the measured value is less than a threshold value corresponding to a predetermined lower limit amount of the stored fuel gas, a step of executing disconnection processing of electrically disconnecting the secondary battery from the auxiliary machinery when the stop processing is executed and the amount of power accumulated in the secondary battery is less than a predetermined lower limit amount of accumulated power, and a step of executing connection processing of electrically connecting the secondary battery to the auxiliary machinery after the disconnection processing is executed and a feeding of the fuel gas to the tank is detected.

The technology of the present disclosure can be implemented in various forms in addition to the fuel cell system and the method of controlling the fuel cell system. For example, the technology can be implemented in forms such as a method of limiting the operation of the fuel cell upon detection of gas running-out, a control device or a computer program for implementing such a method, and a non-transitory recording medium recording such a computer program, and a vehicle on which the fuel cell system is mounted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
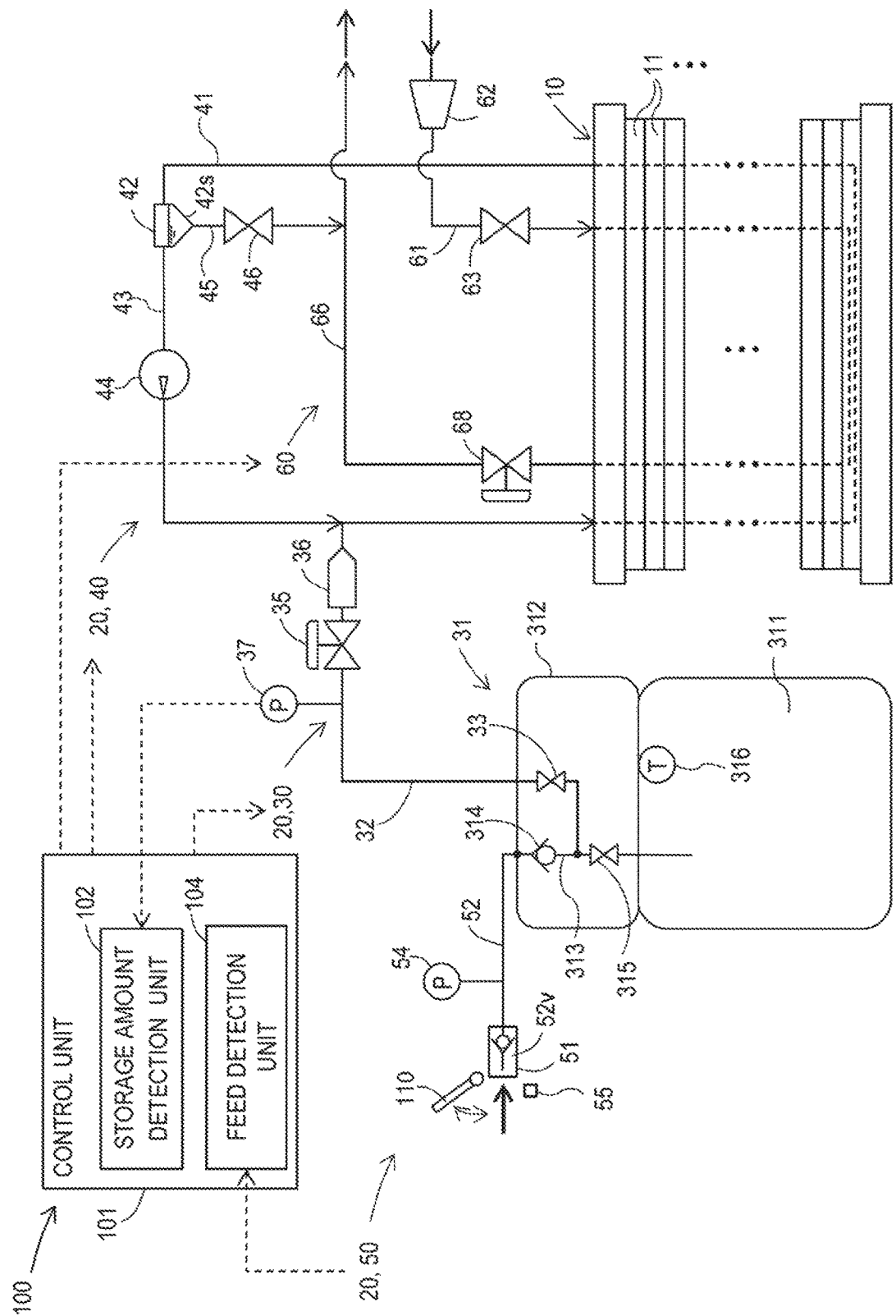
FIG. 1 is a schematic diagram of a fuel cell system.

FIG. 1 is a schematic diagram illustrating a configuration of a fuel cell system 100 according to a first embodiment. The fuel cell system 100 includes a fuel cell 10 for generating power by receiving a supply of a fuel gas and an oxidant gas, which are reactant gases. The fuel cell system 100 according to the first embodiment is mounted on a vehicle and supplies power generated by the fuel cell 10 to a drive motor, an electrical component, a device that supplies power to the outside, auxiliary machines, and the like, of the vehicle.

In the first embodiment, the fuel cell 10 is a solid polymer fuel cell and generates power by an electrochemical reaction between hydrogen as a fuel gas and oxygen as an oxidant gas. The fuel cell 10 has a stack structure in which a plurality of single cells 11 is stacked. Each of the single cells 11 is a power generation element capable of generating power even by itself, and includes a membrane electrode assembly that is a power generation body in which electrodes including a catalyst are arranged on both surfaces of an electrolyte membrane, and two separators that sandwich the membrane electrode assembly. The electrolyte membrane includes a solid polymer thin film that exhibits good proton conductivity in a wet state in which the electrolyte membrane contains moisture inside. An illustration of each component of the above-described single cell 11 is omitted. Moreover, the fuel cell 10 is not limited to a solid polymer electrolyte fuel cell, and various other kinds of fuel cells may be employed. In another embodiment, for example, a solid oxide fuel cell may be employed as the fuel cell 10.

The fuel cell system 100 includes a control unit 101 that controls an operation of the fuel cell 10. The control unit 101 includes an electronic control unit (ECU) including at least one processor and a primary storage device. The processor executes a program or an instruction read on the primary storage device. As such, the control unit 101 fulfills various functions for controlling the operation of the fuel cell 10. In addition, at least part of the function of the control unit 101 may be constituted with a hardware circuit. The control unit 101 includes, as functional units, a storage amount detection unit 102 and a feed detection unit 104. The storage amount detection unit 102 and the feed detection unit 104 will be described below.

The fuel cell system 100 further includes a fuel gas supply and discharge system 20 and an oxidant gas supply and discharge system 60 as components that control a supply of reaction gas to the fuel cell 10. The fuel gas supply and discharge system 20 includes a supply unit 30 that supplies the fuel gas to the anode of the fuel cell 10, and a circulation unit 40 that discharges effluent water discharged from the anode of the fuel cell 10 and circulates the fuel gas, which has not been used for generation power, to the fuel cell 10. Further, the fuel gas supply and discharge system 20 includes a feed unit 50 that feeds the fuel gas to the supply unit 30.

The supply unit 30 includes a tank 31 that stores a high-pressure fuel gas. The supply unit 30 may include a plurality of tanks 31, and the tank 31 may be a high-pressure tank. The tank 31 may have a pressure resistance of 30 MPa to 80 MPa. The tank 31 includes a tank main body part 311 constituted with a hollow container, and a cap part 312 for sealing an opening of the tank main body part 311. The tank main body part 311 has a configuration in which a surface layer of a resin liner is covered with a reinforcing fiber layer. The reinforcing fiber layer is formed by thermosetting a thermosetting resin impregnated in a carbon fiber wound around the surface layer of the resin liner. Alternatively, in another embodiment, the tank main body part 311 may have a metal liner instead of the resin liner.

The cap part 312 is a metal part air-tightly attached to the opening provided at one end of the tank main body part 311. The cap part 312 is provided with a gas flow path 313 that communicates with the internal space of the tank main body part 311. The gas flow path 313 is provided with a check valve 314 and a manual valve 315. The check valve 314 prevents the fuel gas from flowing backward from the tank main body part 311 to a feed pipe 52 of the feed unit 50 to be described below. The manual valve 315 is provided closer to the tank main body part 311 than the check valve 314. The manual valve 315 is normally open, and is manually closed by an operator during, for example, maintenance.

Inside the tank main body part 311, a temperature measurement unit 316 is provided at a position exposed to the fuel gas filled in the tank main body part 311, and fixed on the cap part 312. The temperature measurement unit 316 includes a temperature sensor. The temperature measurement unit 316 measures the internal temperature of the tank 31 and outputs the measurement result to the control unit 101.

The supply unit 30 further includes a supply pipe 32 that connects the tank 31 and the anode inlet of the fuel cell 10. The supply pipe 32 is connected to a portion between the check valve 314 and the manual valve 315 in the gas flow path 313 provided in the cap part 312 of the tank 31.

The supply unit 30 further includes a main stop valve 33, a regulator 35, and a supply device 36, as components that control a flow of the fuel gas in the supply pipe 32. The main stop valve 33, the regulator 35, and the supply device 36 are provided in the supply pipe 32 in order from the upstream side, which is the tank 31 side.

The main stop valve 33 is constituted with an electromagnetic valve that electromagnetically opens and closes under control of the control unit 101. The main stop valve 33 controls an outflow of the fuel gas from the tank 31 to the supply pipe 32. In the first embodiment, the main stop valve 33 is integrally attached to the cap part 312 of the tank 31. The main stop valve 33 is one piece of auxiliary machinery 120 that is driven using the power in the secondary battery 86 illustrated in FIG. 2 to be referred to below. The control unit 101 normally opens the main stop valve 33 when starting the operation of the fuel cell system 100, keeps the main stop valve 33 open during the operation of the fuel cell 10, and closes the main stop valve 33 when terminating the operation of the fuel cell system 100.

The regulator 35 is a depressurizing valve, and adjusts the pressure inside the supply pipe 32 on the upstream side of the supply device 36. The supply device 36 periodically repeats opening and closing, and sends the fuel gas to the fuel cell 10 under the control of the control unit 101. The supply device 36 includes, for example, an injector that is an electromagnetically driven on-off valve that opens and closes at a set drive cycle. The control unit 101 adjusts the supply amount of the fuel gas to the fuel cell 10 by controlling the drive cycle of the supply device 36.

The supply unit 30 further includes a pressure detection unit 37 that detects the pressure of the fuel gas flowing out from the tank 31 to the supply pipe 32. The pressure detection unit 37 includes a pressure sensor. The pressure detection unit 37 is provided on the downstream side of the main stop valve 33 and on the upstream side of the regulator 35. In the first embodiment, the storage amount detection unit 102 acquires the pressure detected by the pressure detection unit 37 when the main stop valve 33 is open, as a measured value representing the amount of the fuel gas stored in the tank 31. In gas running-out processing to be described below, the control unit 101 detects gas in which the amount of the fuel gas stored in the tank 31 is less than a prescribed lower limit stored amount, based on a determination using a detection result obtained by the storage amount detection unit 102.

Further, when the supply unit 30 includes the plurality of tanks 31, each of the tanks 31 is connected in parallel to a common supply pipe 32 on the upstream side of the regulator 35. In addition, one main stop valve 33, one check valve 314, and one manual valve 315 are provided in each tank 31. In the above configuration, the measured value representing the amount of the stored fuel gas detected by the storage amount detection unit 102 represents a total amount of the fuel gas stored in each tank 31.

The circulation unit 40 includes an effluent gas pipe 41, a gas and liquid separation unit 42, a circulation pipe 43, a circulation pump 44, an effluent water pipe 45, and an effluent water valve 46. The effluent gas pipe 41 is connected to the anode outlet of the fuel cell 10 and the gas and liquid separation unit 42, and sends, to the gas and liquid separation unit 42, the effluent gas, on the anode side, including the fuel gas that has not been used for power generation at the anode of the fuel cell 10, and the effluent water.

The gas and liquid separation unit 42 separates the gas component and the liquid component from the effluent gas flowing in through the effluent gas pipe 41, and reserves, in a reservation part 42s inside the gas and liquid separation unit 42, the liquid component in a liquid state as the effluent water. The gas and liquid separation unit 42 is connected to the circulation pipe 43 at the upper portion of the reservation part 42s. The circulation pipe 43 connects the gas and liquid separation unit 42, and a portion downstream of the supply device 36 of the supply pipe 32 of the supply unit 30. The circulation pipe 43 is provided with a circulation pump 44. The gas component including the gas component, separated from the effluent gas, in the gas and liquid separation unit 42 is sent to the circulation pipe 43, sent to the supply pipe 32 by driving of the circulation pump 44, and is circulated to the anode of the fuel cell 10 by the supply device 36.

The effluent water pipe 45 is connected to the reservation part 42s of the gas and liquid separation unit 42. The effluent water pipe 45 is provided with an effluent water valve 46 that opens and closes under the control of the control unit 101. The control unit 101 normally closes the effluent water valve 46 during the operation of the fuel cell 10 and opens the effluent water valve 46 at a predetermined time, such that the effluent water reserved in the reservation part 42s is discharged through the effluent water pipe 45 to the outside of the vehicle. In the first embodiment, the effluent water pipe 45 is connected to an effluent gas pipe 66 of an oxidant gas supply and discharge system 60 to be described below, and the effluent water is discharged to the outside of the fuel cell system 100 through the effluent gas pipe 66.

The feed unit 50 includes a receptacle 51 that receives the fuel gas fed thereto, a feed pipe 52 that connects the receptacle 51 and the tank 31, a pressure measurement unit 54 provided in the feed pipe 52, and a communication unit 55. The fuel gas is fed to each tank 31 of the supply unit 30 through the receptacle 51. The receptacle 51 is provided at a body of the vehicle while opening toward the outside of the vehicle. The receptacle 51 is connected to an upstream end of the gas flow path 313 provided in the cap part 312 of the tank 31 through the feed pipe 52.

The receptacle 51 is normally attached to the vehicle in a rotatable manner except when the fuel gas is fed, and is closed by a lid 110 that is a part of the vehicle body. In a state in which the lid 110 is open, the receptacle 51 is connected to a fuel gas injection nozzle provided in a fuel gas feeding source. The fuel gas feeding source is, for example, a dispenser provided at a hydrogen station. The fuel gas injected from the injection nozzle flows into the feed pipe 52 through the receptacle 51. The inlet of the feed pipe 52 is provided with an inlet check valve 52v that prevents the fuel gas that has flown into the feed pipe 52 from leaking to the outside.

Further, when the supply unit 30 includes the plurality of tanks 31, the upstream end of the gas flow path 313 of each tank 31 is connected in parallel to a common feed pipe 52. Each tank 31 is fed with the fuel gas at once through the common receptacle 51 and the common feed pipe 52.

The pressure measurement unit 54 measures the pressure of the fuel gas flowing through the feed pipe 52, and outputs a measurement result to the control unit 101. The pressure measurement unit 54 includes, for example, a pressure sensor. The communication unit 55 is provided in the vicinity of the receptacle 51 and mediates communication between the control unit 101 and the fuel gas feeding source. The communication unit 55 includes, for example, an infrared communication device.

When the feeding of the fuel gas to the tank 31 is started, the control unit 101 starts communication with the fuel gas feeding source via the communication unit 55. The control unit 101 transmits, to the fuel gas feeding source, a pressure measurement result obtained by the pressure measurement unit 54 and a measurement result of the internal temperature of the tank 31 obtained by the temperature measurement unit 316. The above information is used for controlling the amount of fuel gas fed by the fuel gas feeding source side.

The feed detection unit 104 detects the feeding of the fuel gas to the tank 31 through the feed unit 50, and records the detection history. In the first embodiment, the feed detection unit 104 detects the feeding of the fuel gas when the pressure measurement unit 54 detects a pressure increase in the feed pipe 52. The feed detection unit 104 sets a flag representing that the feeding of the fuel gas has been performed, and stores the flag in a non-volatile manner. A detection result obtained by the feed detection unit 104 is used in startup processing after execution of disconnection processing to be described below.

In another embodiment, the feed detection unit 104 may detect the feeding of the fuel gas to the tank 31 using a method other than the method of detecting the pressure increase in the feed pipe 52. The feed detection unit 104 may detect the feeding of the fuel gas, for example, when communication by the communication unit 55 is started. Alternatively, the feed detection unit 104 may detect the feeding of the fuel gas when the temperature measurement unit 316 detects an increase in the internal temperature of the tank 31. When the vehicle is provided with a sensor that detects opening and closing of the lid 110, the feed detection unit 104 may detect the feeding of the fuel gas when the sensor detects opening of the lid 110. Further, when the vehicle is equipped with a device having a GPS function, such as a navigation system, the feed detection unit 104 may acquire position information of the vehicle from the device, and then detect the feeding of the fuel gas when the device detects a fact that the vehicle is located at a hydrogen station. The feed detection unit 104 may detect the feeding of the fuel gas to the tank 31 by combining the various cases described above.

The oxidant gas supply and discharge system 60 supplies, to the fuel cell 10, as an oxidant gas, oxygen contained in the air taken into the inside of the vehicle via the front grille of the vehicle. The oxidant gas supply and discharge system 60 includes a supply pipe 61, a compressor 62, and an on-off valve 63. The supply pipe 61 is connected to a cathode inlet of the fuel cell 10. The compressor 62 and the on-off valve 63 are provided in the supply pipe 61. The compressor 62 sends, to the cathode of the fuel cell 10 through the supply pipe 61, compressed gas obtained by compressing the air taken from the outside of the vehicle. The on-off valve 63 is normally in a closed state, and is opened by the compression of the compressed gas sent from the compressor 62, such that the compressed gas is allowed to flow into the fuel cell 10.

The oxidant gas supply and discharge system 60 discharges, to the outside of the vehicle, the effluent gas discharged from the cathode of the fuel cell 10. The oxidant gas supply and discharge system 60 includes an effluent gas pipe 66 and a pressure regulating valve 68. The effluent gas pipe 66 is connected to the cathode outlet, and sends, to the outside of the vehicle, the effluent gas discharged from the cathode of the fuel cell 10. The pressure regulating valve 68 is provided in the effluent gas pipe 66, and, under the control of the control unit 101, adjusts the back pressure on the cathode side of the fuel cell 10.

Figure 2:
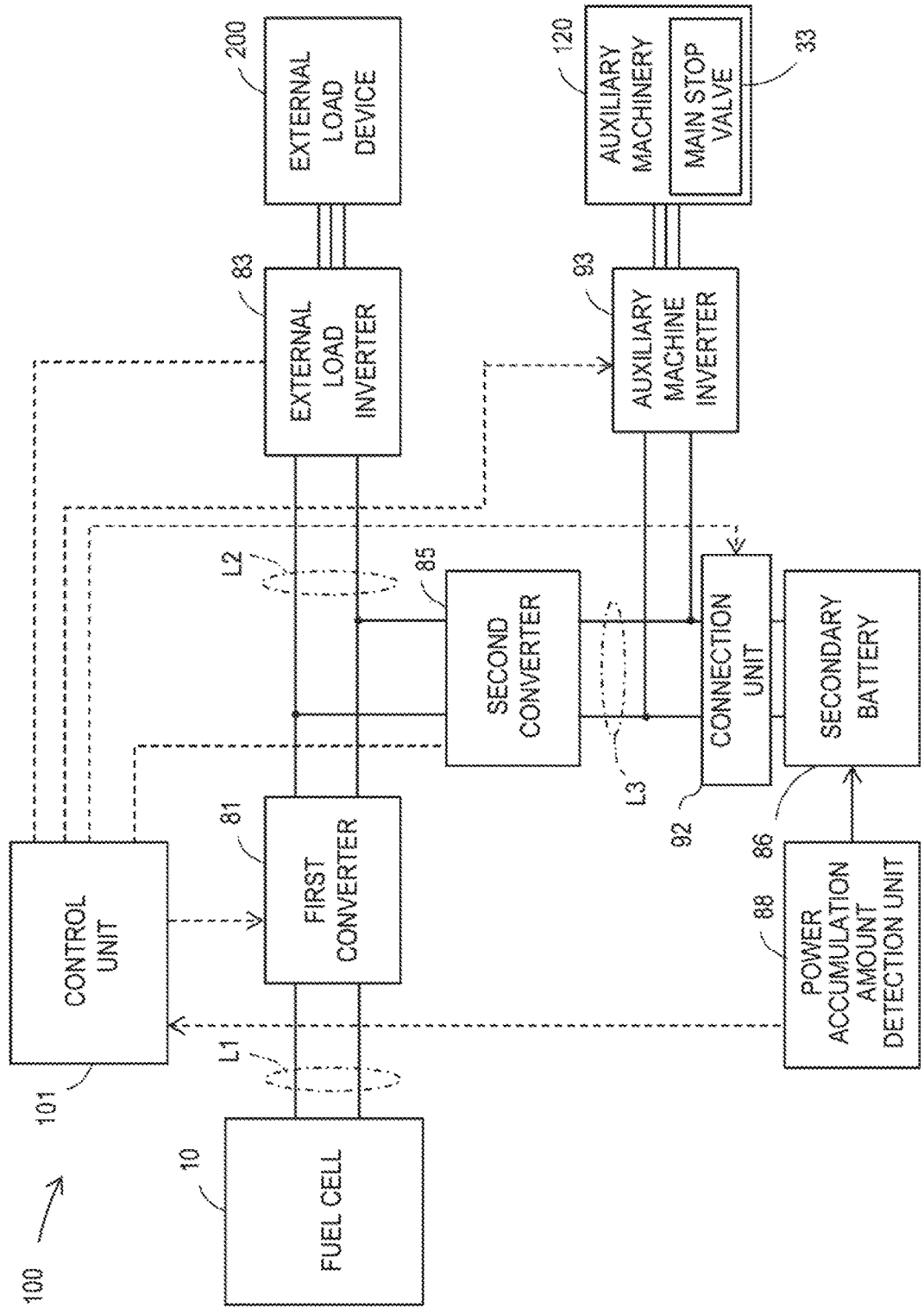
FIG. 2 is a schematic diagram illustrating an electrical configuration of the fuel cell system.

FIG. 2 is a schematic diagram illustrating an electrical configuration of the fuel cell system 100. The fuel cell system 100 includes a first converter 81, an external load inverter 83, a second converter 85, a secondary battery 86, a power accumulation amount detection unit 88, a connection unit 92, and an auxiliary machine inverter 93. The fuel cell 10 is connected to an input terminal of the first converter 81 via a first direct current conductor L1. The first converter 81 includes a boost converter. Under the control of the control unit 101, the first converter 81 controls output current of the fuel cell 10 by boosting output voltage of the fuel cell 10.

An output terminal of the first converter 81 is connected to a direct current terminal of the external load inverter 83 via a second direct current conductor L2. The external load inverter 83 performs conversion between direct current and alternating current. An alternating current terminal of the external load inverter 83 is connected to an external load device 200. The external load device 200 includes the drive motor, the electrical component, the device that supplies power to the outside, and the like, of the vehicle, which are described above. The external load inverter 83 is provided for each load device included in the external load device 200. However, in FIG. 2, it is illustrated by one block for the sake of convenience. The control unit 101 controls alternating current power supplied to the external load device 200, by the external load inverter 83.

The second converter 85 is connected to the second direct current conductor L2, and the secondary battery 86 is connected to the second converter 85 via a third direct current conductor L3. The secondary battery 86 includes, for example, a lithium ion battery. The secondary battery 86 accumulates part of the power generated by the fuel cell 10 or regenerative power generated by the external load device 200. Together with the fuel cell 10, the secondary battery 86 functions as a power source of the fuel cell system 100 under the control of the control unit 101. Further, the secondary battery 86 supplies power to the auxiliary machinery 120 to be described below. The control unit 101 controls the second converter 85, adjusts voltage of the second direct current conductor L2, and controls charging and discharging of the secondary battery 86.

The power accumulation amount detection unit 88 detects the amount of accumulated power in the secondary battery 86. The amount of accumulated power is represented by state of charge (SOC). The power accumulation amount detection unit 88 outputs a detection result to the control unit 101.

The third direct current conductor L3 that connects the second converter 85 and the secondary battery 86 is connected to a direct current terminal of the auxiliary machine inverter 93. An alternating current terminal of the auxiliary machine inverter 93 is connected to the auxiliary machinery 120 used for controlling the operation of the fuel cell system 100 or the vehicle. The auxiliary machinery 120 is used for the operation of the fuel cell 10 and is driven by the power in the secondary battery 86, among the auxiliary machinery 120 mounted on the vehicle. In the first embodiment, the auxiliary machinery 120 includes the main stop valve 33 described above. In addition, the auxiliary machinery 120 may include a compressor 62, a circulation pump 44, and the like. Moreover, the auxiliary machine inverter 93 is provided for each auxiliary machine included in the auxiliary machinery 120. However, in FIG. 2, it is illustrated by one block for the sake of convenience. The auxiliary machine inverter 93 converts the direct current output from the secondary battery 86 into the alternating current, and supplies the alternating current to the auxiliary machinery 120. The control unit 101 controls, via the auxiliary machine inverter 93, alternating current power supplied to the auxiliary machinery 120.

The connection unit 92 switches on or off the electrical connection between the secondary battery 86 and the second direct current conductor L2, under the control of the control unit 101. The connection unit 92 includes, for example, a relay circuit. Normally, during the operation of the fuel cell system 100, the control unit 101 causes the connection unit 92 to electrically connect the secondary battery 86 to the auxiliary machinery 120 and the external load device 200 through the second direct current conductor L2. In the gas running-out processing to be described below, when the gas running-out is detected and the amount of power accumulated in the secondary battery 86 is insufficient, the control unit 101 executes the disconnection processing that causes the connection unit 92 to electrically disconnect the secondary battery 86 from the auxiliary machinery 120 and the external load device 200.

Figure 3A:
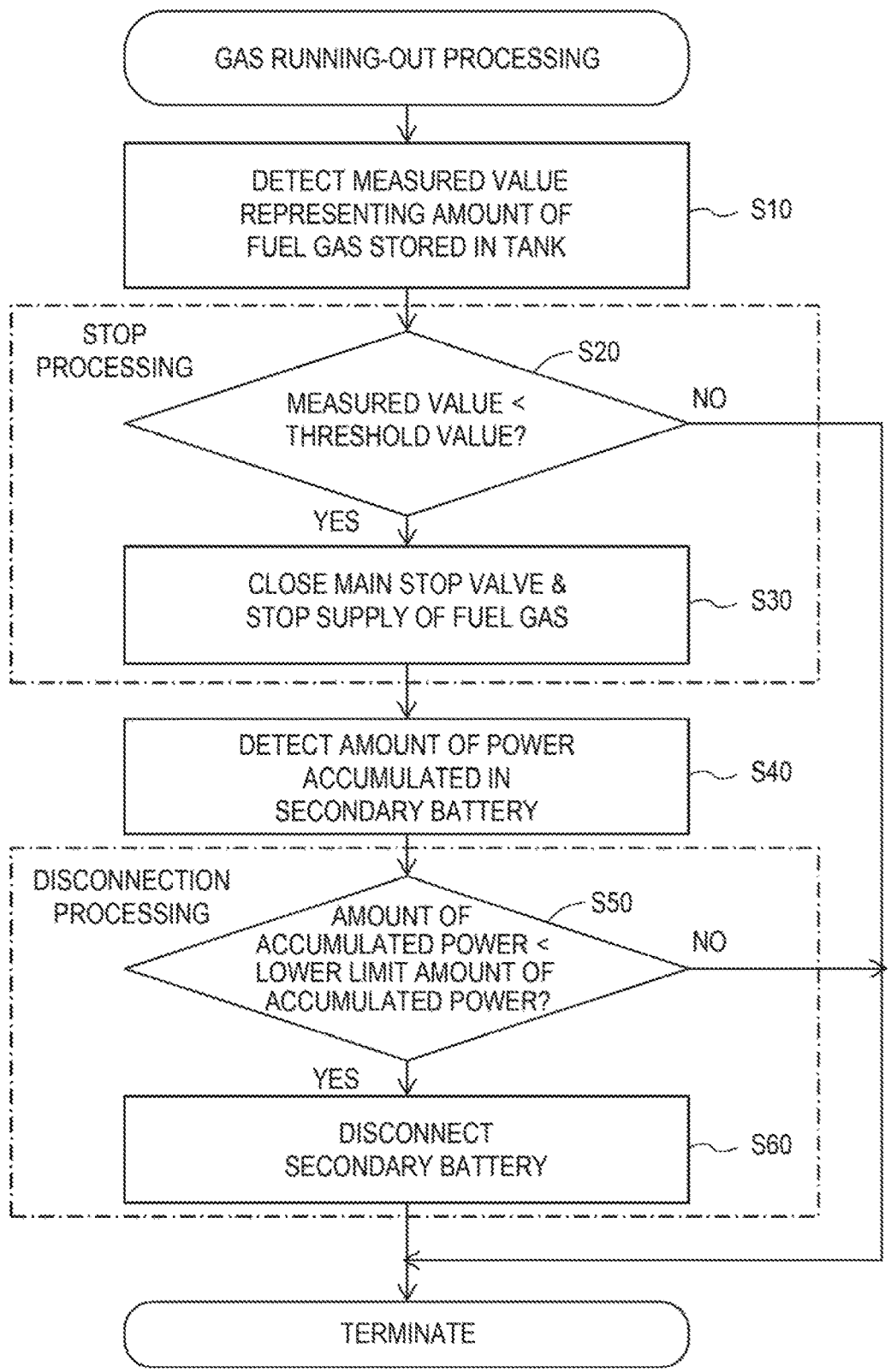
FIG. 3A is a flowchart describing a flow of gas running-out processing according to a first embodiment.

FIG. 3A is a flowchart describing a flow of the gas running-out processing according to the first embodiment. The gas running-out processing is executed to prevent a situation from occurring in which the operation of the fuel cell 10 is continued while the amount of the fuel gas stored in the tank 31 is less than a predetermined lower limit stored amount. The control unit 101 monitors the amount of the fuel gas stored in the tank 31 by repeatedly executing the gas running-out processing at a predetermined control cycle during the operation of the fuel cell system 100 after the startup of the fuel cell system 100.

In step S10, the storage amount detection unit 102 acquires the pressure of the fuel gas in the supply pipe 32 detected by the pressure detection unit 37 as a measured value representing the amount of the fuel gas stored in the tank 31. Using the measured value, the control unit 101 determines whether to execute the stop processing in subsequent steps S20 to S30.

In step S20, the control unit 101 determines whether the measured value detected by the storage amount detection unit 102 is less than a threshold value corresponding to a predetermined lower limit amount of the fuel gas amount stored in the tank 31. In the first embodiment, the control unit 101 determines whether the pressure of the fuel gas detected by the pressure detection unit 37 is less than a predetermined lower limit pressure as a threshold value corresponding to the lower limit stored amount. The lower limit pressure may be a value greater than the lower limit value of the internal pressure of the tank 31. The lower limit value may be a value with which deterioration does not occur in the tank 31, and which is obtained in advance by experiments or the like. When the lowest pressure to be used for the tank 31 is set, the lower limit pressure may be greater than the lower limit pressure.

When the measured value detected in step S10 is equal to or greater than the threshold value, that is, when the pressure of the fuel gas in the tank 31 is equal to or greater than the lower limit pressure, the control unit 101 terminates the gas running-out processing and continues the operation of the fuel cell 10. In this case, since the amount of the fuel gas stored in the tank 31 is equal to or greater than a lower limit stored amount, it is expected that the normal operation of the fuel cell 10 can be continued.

On the contrary, when the measured value detected in step S10 is less than the threshold value, that is, when the pressure of the fuel gas detected by the pressure detection unit 37 is less than the lower limit pressure, the control unit 101 executes valve closure processing of closing the main stop valve 33 in step S30. As such, the control unit 101 stops the operation of the fuel cell 10 by causing the supply unit 30 of the fuel gas supply and discharge system 20 to stop the supply of the fuel gas to the fuel cell 10. It is because in this case, there is a possibility that a normal operation of the fuel cell 10 is hindered by an occurrence of the gas running-out in which the amount of the fuel gas stored in the tank 31 is less than the lower limit stored amount. Further, in the present specification, "stopping the operation of the fuel cell 10" means terminating control of supply of the reactant gas for causing the fuel cell 10 to output target output power. Therefore, a state in which the operation of the fuel cell 10 is stopped includes a state in which power generation of the fuel cell 10 is continued by the reactant gas remaining after the supply of the gas is stopped.

In addition, in the first embodiment, in step S30, the control unit 101 also causes the oxidant gas supply and discharge system 60 to stop supply of the oxidant gas to the fuel cell 10. Moreover, the control unit 101 may notify a user that the operation of the fuel cell 10 has been stopped due to insufficient fuel gas, via a notification unit, such as a vehicle indicator or a display (not shown).

By execution of the stop processing in steps S20 to S30, it is possible to prevent a situation from occurring in which the operation of the fuel cell 10 is continued in a state in which the amount of supplied fuel gas cannot be secured due to the occurrence of the gas running-out. Therefore, it is possible to prevent an excessive load from being applied on the fuel cell 10 due to power generation in a state in which the reactant gas is insufficient. For example, it is possible to prevent a malfunction, such as deterioration of a catalyst due to the insufficient fuel gas or a reduction in system efficiency due to reduction in power generation efficiency of the fuel cell 10, from occurring.

Further, in the gas running-out processing according to the first embodiment, when the gas running-out is detected, the main stop valve 33 is closed. As such, the fuel gas is prevented from flowing from the tank 31 into the supply pipe 32, and the internal pressure of the tank 31 is prevented from further decreasing. Therefore, the internal pressure of the tank 31 is prevented from decreasing to such a point where a low pressure in the tank 31 deteriorates.

Further, after executing the stop processing in steps S20 to S30, in step S40, the control unit 101 causes the power accumulation amount detection unit 88 to detect the amount of power stored in the secondary battery 86. The detected amount of power accumulated in the secondary battery 86 is used to determine whether to execute the stop processing in subsequent steps S50 to S60.

In step S50, the control unit 101 determines whether the amount of power accumulated in the secondary battery 86 is smaller than a predetermined lower limit amount of accumulated power. The lower limit amount of accumulated power is a lower limit value of the amount of accumulated power which is artificially determined, and is a conceptual value different from the threshold value physically needed to maintain the performance of the secondary battery 86. In the first embodiment, the lower limit amount of accumulated power is set to a value that can secure power expected to be consumed in the auxiliary machinery 120, for example, power needed to open the main stop valve 33 from the time when the fuel gas is fed to the time when the operation of the fuel cell 10 is resumed.

When determining in step S50 that the amount of power accumulated in the secondary battery 86 is smaller than the lower limit amount of accumulated power, in step S60, the control unit 101 causes the connection unit 92 to electrically disconnect the secondary battery 86 from the auxiliary machinery 120 and the external load device 200. As such, the power remaining in the secondary battery 86 is prevented from being consumed by the auxiliary machinery 120 or the external load device 200. In step S60, the control unit 101 may notify the user via the notification unit that the operation of the fuel cell 10 cannot be resumed until the fuel gas is fed. After executing the disconnection processing, the control unit 101 terminates the gas running-out processing. In this case, since the operation of the fuel cell 10 is stopped and the supply of power from the secondary battery 86 is also stopped, the control unit 101 terminates the operation of the fuel cell system 100.

In step S50, when the amount of power accumulated in the secondary battery 86 is equal to or greater than the lower limit amount of accumulated power, the control unit 101 terminates the gas running-out processing as is. In this case, the control unit 101 performs control for continuing the supply of power in the secondary battery 86 to the auxiliary machinery 120 and the external load device 200 while stopping the operation of the fuel cell 10. During this control, the vehicle can travel using the power in the secondary battery 86. During this control, the control unit 101 may notify the user via the notification unit that the operation of the fuel cell system 100 is being continued by the power in the secondary battery 86 while the fuel cell 10 is generating power.

Further, even when the supply of the fuel gas to the fuel cell 10 is stopped by the stop processing, the control unit 101 continuously repeats the gas running-out processing while the power in the secondary battery 86 is supplied to the auxiliary machinery 120 or the external load device 200, and the operation of the fuel cell system 100 is continued. When the fuel gas is fed during the operation of the fuel cell system 100, and the amount of fuel gas stored in the tank 31 is equal to or greater than the lower limit stored amount, the control unit 101 opens the main stop valve 33 and resumes the supply of the fuel gas to the fuel cell 10.

Figure 3B:
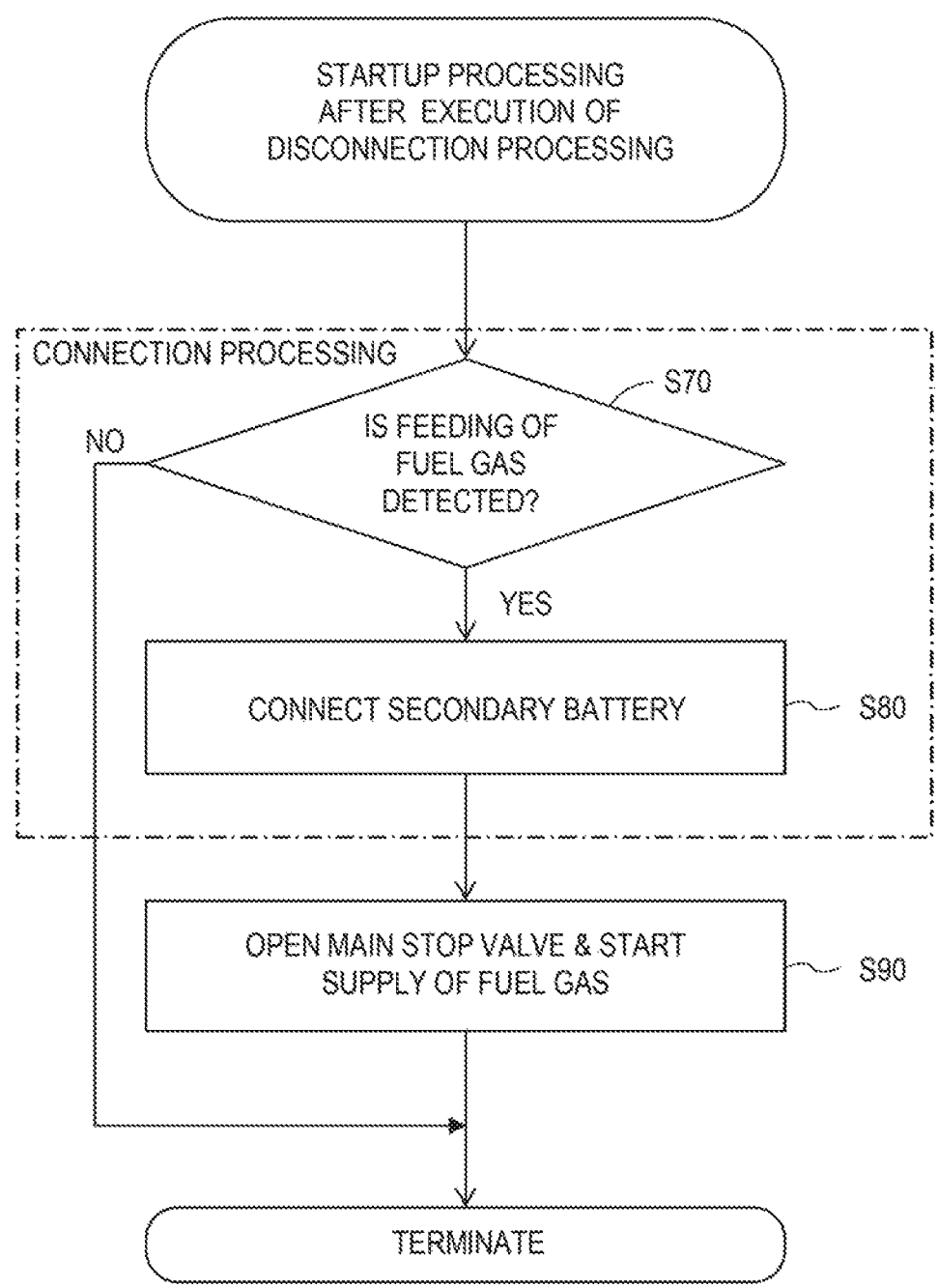
FIG. 3B is a flowchart describing a flow of startup processing according to the first embodiment.

FIG. 3B is a flowchart describing a flow of startup processing executed when the fuel cell system 100 is restarted after the disconnection processing is executed in the gas running-out processing. The startup processing is executed when the user performs the startup operation of the fuel cell system 100 after the disconnection processing is executed in the gas running-out processing and the operation of the fuel cell system 100 is terminated. The startup processing may be automatically executed when the startup time of the fuel cell system 100 predetermined in the control unit 101 arrives, not by the user's direct operation.

Steps S70 to S80 are connection processing of electrically connecting the secondary battery 86 to the auxiliary machinery 120 when the feeding of the fuel gas to the tank 31 is detected. In step S70, the control unit 101 determines whether the feed detection unit 104 has detected the feeding of the fuel gas to the tank 31 through the feed pipe 52 of the feed unit 50 after the disconnection processing is executed in the gas running-out processing. When the feed detection unit 104 has detected the feeding of the fuel gas to the tank 31 after the disconnection processing, in step S80, the control unit 101 causes the connection unit 92 to electrically connect the secondary battery 86 to the auxiliary machinery 120 and the external load device 200.

After the above connection processing is executed, in step S90, the control unit 101 enables the fuel gas to be supplied from the tank 31 to the fuel cell 10 by opening the main stop valve 33, and starts the operation of the fuel cell system 100. Further, the control unit 101 starts the operation of the fuel cell 10 by causing the fuel gas supply and discharge system 20 and the oxidant gas supply and discharge system 60 to start the supply of the reaction gas to the fuel cell 10.

In step S70, when there is no history of detecting the feeding of fuel gas to the tank 31, the control unit 101 terminates the startup processing as is. In this case, the fuel cell system 100 is not started and its operation is not resumed. As such, when the disconnection processing is executed in the gas running-out processing, the fuel cell system 100 cannot be started until the fuel gas is fed to the tank 31 through the feed pipe 52 of the feed unit 50.

As described above, in the fuel cell system 100 according to the first embodiment, when the stop processing and the disconnection processing are executed in the gas running-out processing, the secondary battery 86 is electrically disconnected from the load device until the feeding of the fuel gas is detected. As such, in the startup processing in step S90, the power needed to start the operation of the fuel cell 10, which includes the power in the secondary battery 86 needed to open the main stop valve 33 is prevented from being insufficient. Therefore, the fuel cell 10 is prevented from falling into a state in which its operation cannot be resumed due to insufficient power in the secondary battery 86 even though the fuel gas is fed to the tank 31 after the execution of the stop processing and the disconnection processing.

Further, in the fuel cell system 100 according to the first embodiment, when the fuel gas is fed to the tank 31 in the startup processing after the execution of the stop processing and the disconnection processing in the gas running-out processing, the electrical connection between the secondary battery 86 and the auxiliary machinery 120 is restored by the connection processing. Therefore, the fuel cell 10 is prevented from falling into the state in which its operation cannot be resumed since power is not supplied from the secondary battery 86 to the auxiliary machinery 120 and the main stop valve 33 remains closed after the feeding of the fuel gas.

Furthermore, in the fuel cell system 100 according to the first embodiment, when the gas running-out in which the amount of the fuel stored in the tank 31 is less than the lower limit stored amount is detected, the supply of the fuel gas to the fuel cell 10 is stopped, and the operation of the fuel cell 10 is stopped. Therefore, the operation of the fuel cell 10 is prevented from being continued while the supplied amount of the fuel gas is insufficient, and malfunctions due to the fuel gas running-out are prevented. In addition, in the fuel cell system 100 according to the first embodiment, the main stop valve 33 is closed in a gas running-out state in which the internal pressure of the tank 31 is less than the lower limit pressure. Therefore, a situation in which the deterioration occurs in the tank 31 since the internal pressure of the tank 31 decreases too far below the minimum pressure is prevented.

Second Embodiment

Figure 4:
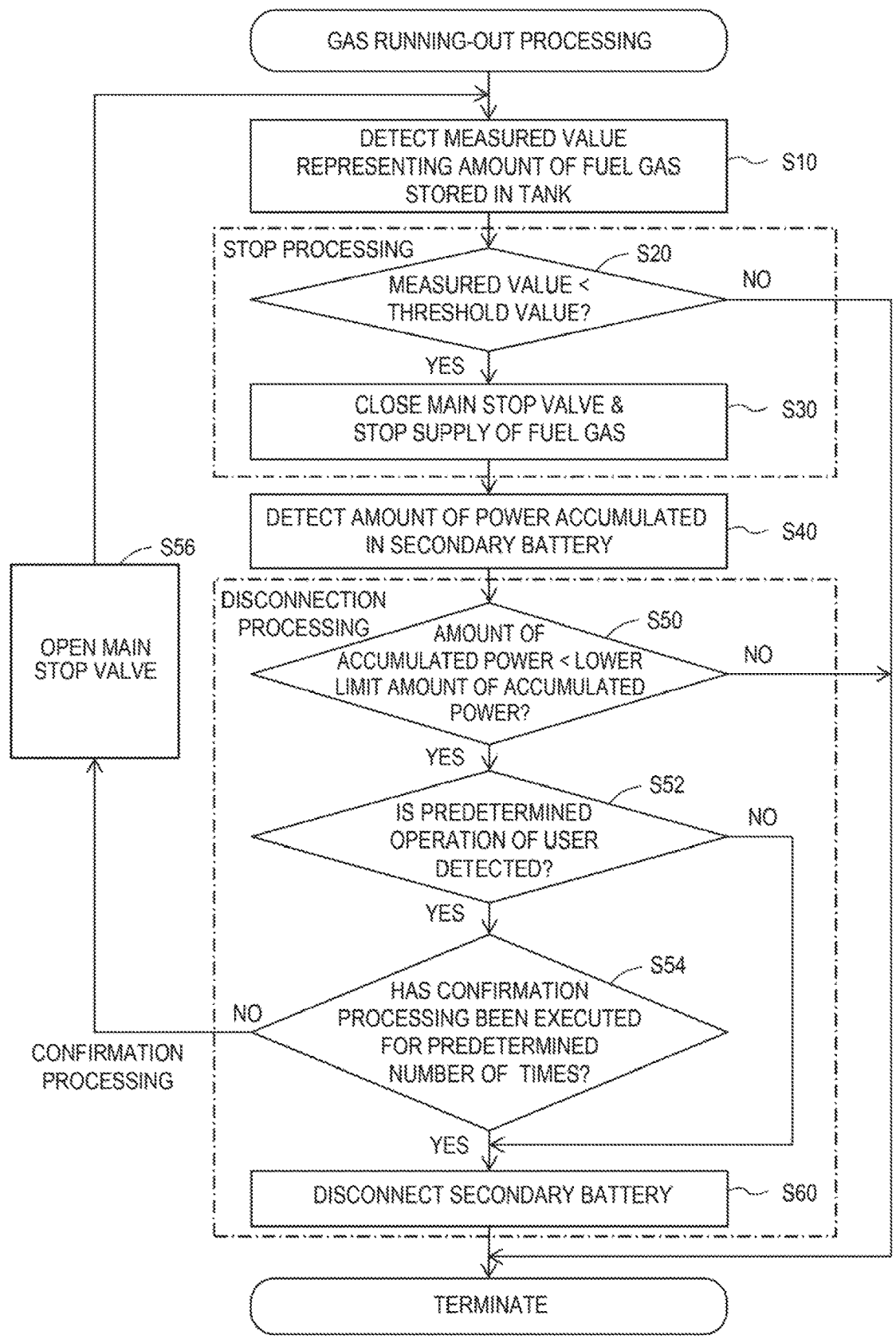
FIG. 4 is a flowchart describing a flow of the gas running-out processing according to a second embodiment.

FIG. 4 is a flowchart describing a flow of the gas running-out processing according to the second embodiment. The configuration of the fuel cell system 100 according to the second embodiment is approximately the same as the configuration described in the first embodiment. The gas running-out processing according to the second embodiment is substantially the same as the gas running-out processing according to the first embodiment except that steps S52, S54, and S56 are added.

In the gas running-out processing according to the second embodiment, the control unit 101 executes the processing in steps S10 to S50 in a similar manner to that described in the first embodiment. Moreover, in the second embodiment, a value of the lower limit amount of accumulated power used as a determination condition in step S50 may be set in anticipation of the power to be consumed by execution of confirmation processing to be described below.

In the second embodiment, when it is determined in step S50 that the amount of power accumulated in the secondary battery 86 is smaller than the lower limit amount of accumulated power, the control unit 101 holds off execution of step S60 during a predetermined operation reception period. The operation reception period is a predetermined period from the time after the main stop valve 33 is closed in step S30. In step S52, the control unit 101 determines whether a predetermined operation of the user that triggers the confirmation processing is detected within the operation reception period. In the confirmation processing, the main stop valve 33 is opened, the pressure of the fuel gas in the supply pipe 32 is detected again by the pressure detection unit 37, whether gas running-out occurs is reconfirmed, and whether to execute the stop processing is re-determined. In the second embodiment, the predetermined operation of the user that triggers the confirmation processing is, for example, an operation that commands the operation of the fuel cell 10 to be resumed. This operation may be an operation of a startup or stop of the vehicle, or an operation that commands the amount of fuel gas stored in the tank 31 to be confirmed.

In step S52, when the predetermined operation of the user is detected within the operation reception period, the control unit 101 determines whether the confirmation processing in step S54 has already been executed for a predetermined number of times after the stop processing in steps S20 to S30 is executed. When the number of times that the confirmation processing is executed after the execution of the first stop processing is smaller than a predetermined number of times, the control unit 101 executes the confirmation processing as below.

In step S56, the control unit 101 opens the main stop valve 33 and re-executes the processing in step S10. In step S10, the storage amount detection unit 102 detects the pressure of the fuel gas again by the pressure detection unit 37, and updates the measured value representing the amount of the fuel gas stored in the tank 31. In step S20, the control unit 101 compares the updated measured value with the lower limit pressure that is a threshold value corresponding to the lower limit stored amount. In step S20, when the determination result is changed, that is, it is determined that the updated measured value is greater than the lower limit pressure that is the threshold, the control unit 101 terminates the gas running-out processing and resumes the normal operation of the fuel cell 10. In step S20, when it is determined that the updated measured value is smaller than the lower limit pressure that is the threshold value, the control unit 101 closes the main stop valve 33 again in step S30. After the execution of the confirmation processing, in step S52, when the predetermined operation of the user is newly detected within the operation reception period, in case where the number of times that the confirmation processing is executed is less than a predetermined number, the control unit 101 re-executes the confirmation processing.

In step S52, when the predetermined operation of the user is not detected within the operation reception period, the control unit 101 electrically disconnects the secondary battery 86 from the auxiliary machinery 120 and the external load device 200 in step S60, and terminates the gas running-out processing. When it is determined in step S54 that the number of times that the confirmation processing is executed is equal to or greater than the predetermined number, the control unit 101 electrically disconnects the secondary battery 86 from the auxiliary machinery 120 and the external load device 200 in S60, and terminates the gas running-out processing. As such, when the fuel cell system 100 is started after the disconnection processing is executed, the startup processing illustrated in FIG. 3B is executed in a similar manner to that described in the first embodiment.

As described above, in the gas running-out processing according to the second embodiment, after the execution of the stop processing, re-confirmation processing is repeated in which the amount of the fuel gas stored in the tank 31 is reconfirmed for a predetermined number of times each time the user performs the predetermined operation within the operation reception period. Therefore, a situation in which the operation of the fuel cell 10 remains stopped since the main stop valve 33 remains closed due to, for example, a detection error of the measured value representing the amount of fuel gas stored in the tank 31 is prevented caused by the main stop valve 33 remaining closed due to, for example, a detection error of the measured value representing the amount of fuel gas stored in the tank 31, and the like. Further, since the number of times that the confirmation processing is executed is limited to a predetermined number, it is possible to prevent a situation from occurring in which the confirmation processing is repeated without a limit such that the power in the secondary battery 86 is consumed to the extent that the operation of the fuel cell 10 cannot be resumed after the feeding of the fuel gas. In addition, with the fuel cell system 100 and the control method thereof according to the second embodiment, various functions and effects similar to those described in the first embodiment can be obtained.

Third Embodiment

Figure 5:
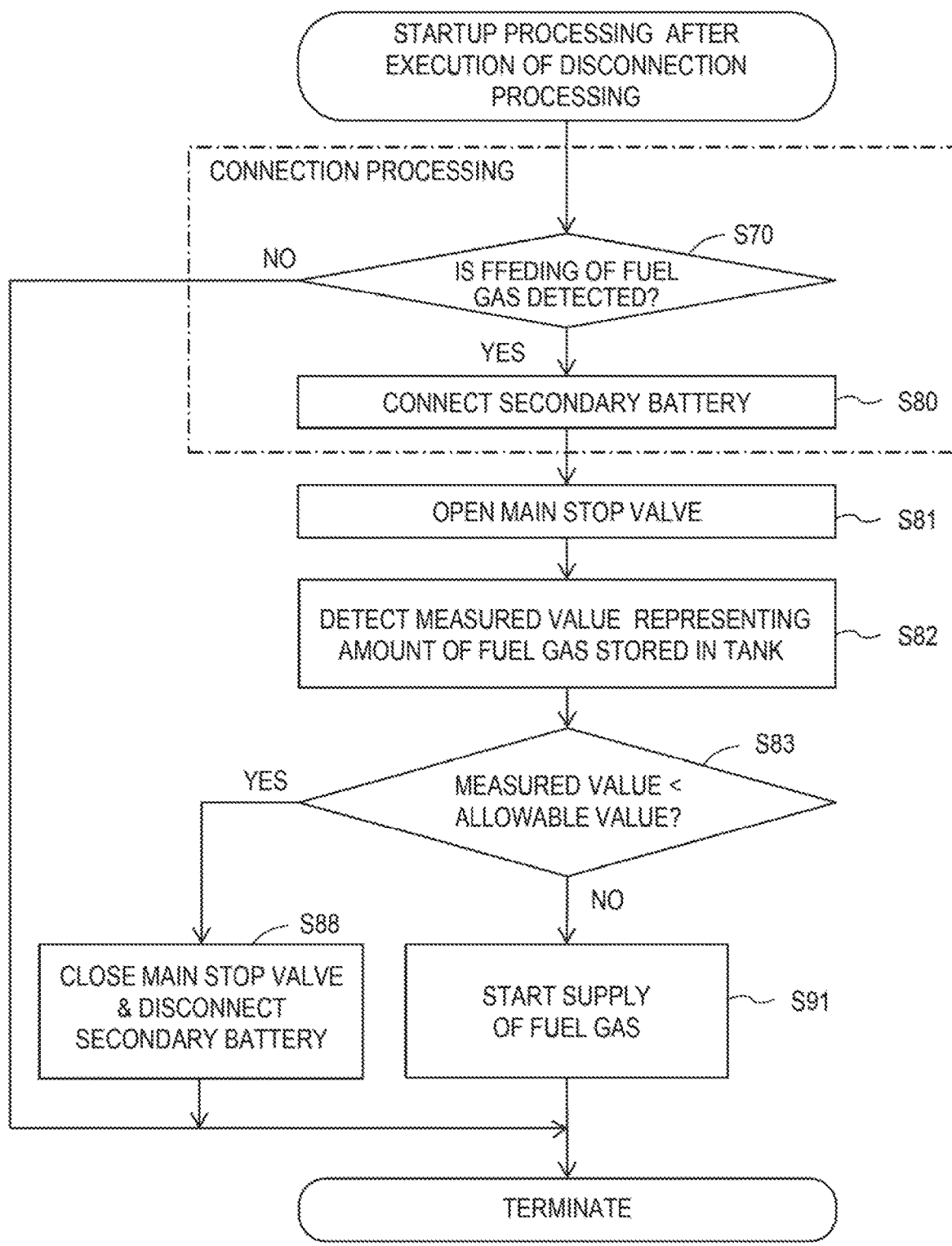
FIG. 5 is a flowchart describing a flow of the startup processing according to a third embodiment.

FIG. 5 is a flowchart describing a flow of the startup processing according to the third embodiment. The configuration of the fuel cell system 100 according to the third embodiment is approximately the same as the configuration described in the first embodiment. The startup processing according to the third embodiment is executed when the fuel cell system 100 is started after the execution of the stop processing and the disconnection processing in the gas running-out processing, in a manner similar to that described in the second embodiment. The startup processing according to the third embodiment is approximately the same as the startup processing illustrated in FIG. 3B and described in the first embodiment, except that the processing after the execution of the connection processing in steps S70 to S80 is different.

The control unit 101 electrically connects the secondary battery 86 to the auxiliary machinery 120 and the external load device 200 in step S80, and then opens the main stop valve 33 in step S81. Moreover, at these steps, the driving of the supply device 36 and the oxidant gas supply and discharge system 60 of the fuel gas supply and discharge system 20 remains stopped, and the operation of the fuel cell 10 is not resumed.

In step S82, the storage amount detection unit 102 acquires the pressure in the supply pipe 32 detected by the pressure detection unit 37 after the main stop valve 33 is opened, as a measured value representing the amount of the fuel gas stored in the tank 31. In step S83, the control unit 101 determines whether the measured value detected in step S82 is smaller than a predetermined allowable value. The allowable value is greater than the threshold corresponding to the lower limit stored amount used in step S20. The allowable value is determined as a value representing an amount of stored fuel gas in which the operation of the fuel cell 10 can be continued over a certain period of time after the resumption of the operation of the fuel cell 10.

When the measured value detected in step S82 is equal to or greater than the allowable value, the control unit 101 starts the supply of the fuel gas to the fuel cell 10 and starts the operation of the fuel cell 10 in step S91. When the measured value detected in step S82 is smaller than the allowable value, the control unit 101 prohibits the supply of the fuel gas to the fuel cell 10 from being started by closing the main stop valve 33 again in step S88. In addition, the control unit 101 causes the connection unit 92 to electrically disconnect the secondary battery 86 from the auxiliary machinery 120 and the external load device 200. As such, the start of the operation of the fuel cell 10 is prohibited, and the fuel cell system 100 enters a standby state in which the fuel cell system 100 waits for the feeding of the fuel gas to the tank 31. Thereafter, when the user performs the startup operation of the fuel cell system 100 or when the pre-set startup time of the fuel cell system 100 arrives, the startup processing is executed again.

As described above, in the fuel cell system 100 according to the third embodiment, even when the feeding of the fuel gas to the tank 31 is detected after the execution of the disconnection processing in the gas running-out processing, the operation of the fuel cell 10 is prohibited even when the fed amount is insufficient. Therefore, a situation in which the amount of power accumulated in the secondary battery 86 is reduced since the amount of the stored fuel gas is insufficient and the operation of the fuel cell 10 is stopped in a short time is prevented. Further, in the fuel cell system 100 according to the third embodiment, if the fuel gas does not insufficiently flow out from the tank 31 to the supply pipe 32 due to a failure of the main stop valve 33, for example, even when the feeding of the fuel gas to the tank 31 is detected after the execution of the disconnection processing, the start of the operation of the fuel cell 10 is also prohibited. Therefore, the operation of the fuel cell 10 is prevented from being started while the supply of the fuel gas to the fuel cell 10 cannot be performed smoothly. In addition, with the fuel cell system 100 and the control method thereof according to the third embodiment, various functions and effects described in the first embodiment and the second embodiment can be obtained.

Fourth Embodiment

Figure 6:
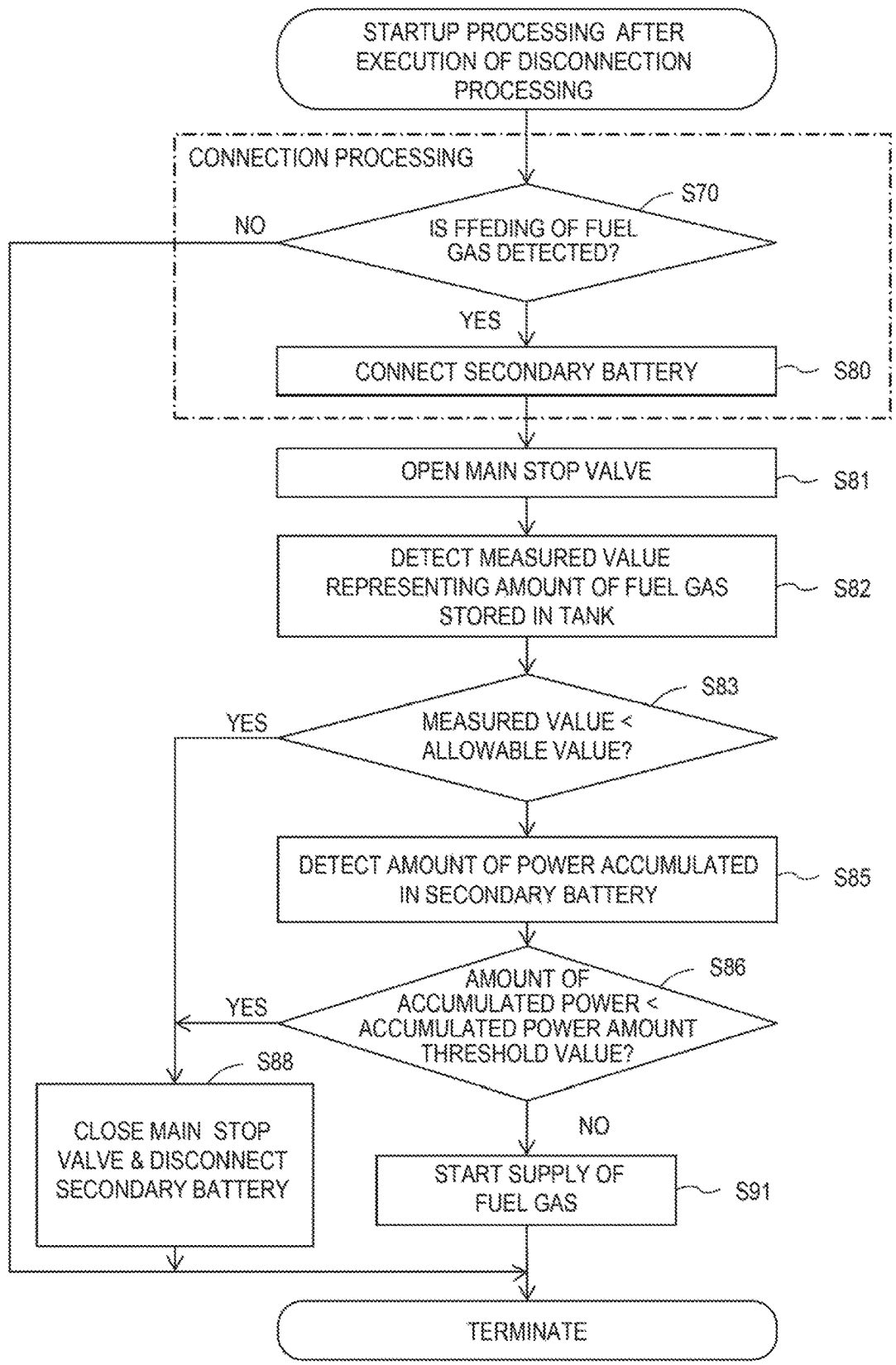
FIG. 6 is a flowchart describing a flow of the startup processing according to a fourth embodiment.

FIG. 6 is a flowchart describing a flow of the startup processing according to the fourth embodiment. The configuration of the fuel cell system 100 according to the fourth embodiment is approximately the same as the configuration described in the first embodiment. The startup processing according to the fourth embodiment is executed when the fuel cell system 100 is started after the execution of the stop processing and the disconnection processing in the gas running-out processing in a similar to that described in the second embodiment. The startup processing according to the fourth embodiment is approximately the same as the startup processing according to the third embodiment except in that the startup processing in steps S85 and S86 is added.

In the startup processing according to the fourth embodiment, when it is determined in step S83 that the measured value detected in step S82 is equal to or greater than the allowable value, the control unit 101 further determines the amount of power accumulated in the secondary battery 86 in steps S85 and S86. In step S85, the control unit 101 causes the power accumulation amount detection unit 88 to detect the current amount of power accumulated in the secondary battery 86. Subsequently, in step S86, the control unit 101 determines whether the amount of accumulated power detected in step S85 is smaller than the predetermined threshold value of the amount of accumulated power. This amount of accumulated power threshold value is a predetermined value as the minimum limit amount of power accumulated in the secondary battery 86 that can allow the resumption of the operation of the fuel cell 10, and is smaller than the lower limit amount of accumulated power used in step S50.

When the amount of accumulated power detected in step S85 is equal to or greater than the accumulated power amount threshold value, the control unit 101 starts the supply of the fuel gas to the fuel cell 10 and starts the operation of the fuel cell 10 in step S91. When the amount of accumulated power detected in step S85 is smaller than the accumulated power amount threshold value, the control unit 101 prohibits the supply of the fuel gas to the fuel cell 10 from being started by closing the main stop valve 33 again in step S88. Moreover, the control unit 101 causes the connection unit 92 to electrically disconnect the secondary battery 86 from the auxiliary machinery 120 and the external load device 200. As such, the operation of the fuel cell 10 is prohibited from being started until the secondary battery 86 is charged.

As described above, in the startup processing according to the fourth embodiment, even when the fuel gas can be supplied to the fuel cell 10 after the execution of the disconnection processing in the gas running-out processing, if the amount of power accumulated in the secondary battery 86 is insufficient, the operation of the fuel cell 10 is prohibited from being resumed. Therefore, a situation is prevented from occurring in which power cannot be supplied to the auxiliary machinery 120 since the amount of power accumulated in the secondary battery 86 is insufficient immediately after the resumption of the operation of the fuel cell 10, such that the operation of the fuel cell 10 is discontinued. In addition, a situation is prevented from occurring in which the performance of the secondary battery 86 deteriorates as the amount of power accumulated in the secondary battery 86 becomes zero. Further, with the fuel cell system 100 and the control method thereof according to the fourth embodiment, various functions and effects described in each of the foregoing embodiments can be obtained.

Other Embodiments

The various configurations described in the foregoing embodiments can be, for example, modified as below. Similar to each of the foregoing embodiments, all of the other embodiments to be described below are examples of aspects for implementing the technology of the present disclosure.

First Other Embodiment

In the gas running-out processing in each of the foregoing embodiments, the valve closure processing of closing the main stop valve 33 in step S30 may be omitted. In step S30, the control unit 101 may only stop driving the supply device 36 so as to stop the supply of the fuel gas to the fuel cell 10.

Second Other Embodiment

The storage amount detection unit 102 may calculate the measured value representing the current amount of the fuel gas stored in the tank 31 using the known capacity of the tank 31, the detection result of the pressure detection unit 37, and the temperature measurement unit 316. Further, the storage amount detection unit 102 may detect the measured value representing the amount of the fuel gas stored in the tank 31 using a method other than a method using the measured result of the pressure in the supply pipe 32 by the pressure detection unit 37. For example, the storage amount detection unit 102 may detect the measured value representing the amount of the fuel gas stored in the tank 31 by calculating an estimated value of an amount of the fuel gas consumption from a value obtained by integrating the power output from the fuel cell 10 after the fuel gas is supplied to the tank 31.

Third Other Embodiment

In the fuel cell system 100 according to each of the foregoing embodiments described above, the secondary battery 86 does not have to be configured to supply power to the external load device 200.

Fourth Other Embodiment

In the fuel cell system 100 according to the third embodiment and the fourth embodiment, the gas running-out processing described in the first embodiment may be executed instead of the gas running-out processing described in the second embodiment. Moreover, the processing in steps S82 and S83 may be omitted in the startup processing according to the fourth embodiment.

Fifth Other Embodiment

In each of the foregoing embodiments, after the disconnection processing is executed in the gas running-out processing, even though it is not at the time of the startup of the fuel cell system 100, the control unit 101 may execute the connection processing when the start of the feeding of the fuel gas to the tank 31 through the feed pipe 52 is detected.

Sixth Other Embodiment

In each of the foregoing embodiments, the fuel cell system 100 does not have to be mounted on the vehicle. For example, the fuel cell system 100 may be provided as a power source in a fixed facility, such as a building. In each of the foregoing embodiments, the vehicle may include a higher-level control unit that controls the operation of the vehicle, separately from the control unit 101 that executes the gas running-out processing.

Others

In the foregoing embodiments, parts or all of the functions and processing implemented by software may be implemented by hardware. In addition, parts or all of the functions and process implemented by hardware may be implemented by software. As the hardware, for example, various circuits, such as an integrated circuit, a discrete circuit, or a combined circuit module thereof can be used.

The technology of the present disclosure is not limited to the foregoing embodiments, and may be implemented with various configurations within a range not departing from the scope of the present disclosure. For example, the technical features in the embodiments corresponding to the technical features in each aspect described in the SUMMARY can be appropriately replaced or combined. Moreover, the technical features may be appropriately deleted in a case where they are not described as essential in the present specification as well as in a case where they are described in the present specification as being inessential.

What is claimed is:

1. A fuel cell system comprising:
a fuel cell configured to generate power by receiving a supply of a fuel gas and an oxidant gas;
auxiliary machinery used for an operation of the fuel cell;
a tank configured to store the fuel gas, the tank being configured to supply the fuel gas stored in the tank to the fuel cell through a supply pipe and receive the fuel gas fed through a feed pipe;
a storage amount detection unit configured to detect a measured value representing an amount of the fuel gas stored in the tank;
a secondary battery configured to supply power to the auxiliary machinery;
a power accumulation amount detection unit configured to detect an amount of power accumulated in the secondary battery;
a feed detection unit configured to detect feeding of the fuel gas to the tank through the feed pipe; and
a control unit configured to control the operation of the fuel cell and a supply of the power from the secondary battery to the auxiliary machinery,
wherein the control unit is configured to:
when the measured value detected by the storage amount detection unit is less than a threshold value corresponding to a predetermined lower limit amount of the fuel gas stored in the tank, execute stop processing of stopping the supply of the fuel gas from the tank to the fuel cell,
when the stop processing is executed and the amount of power accumulated in the secondary battery is less than a predetermined lower limit amount of accumulated power, execute disconnection processing of electrically disconnecting the secondary battery from the auxiliary machinery; and
after the disconnection processing is executed and the feeding of the fuel gas to the tank is detected by the feed detection unit, execute connection processing of electrically connecting the secondary battery to the auxiliary machinery.

2. The fuel cell system according to claim 1, further comprising:
a pressure detection unit configured to detect pressure of the fuel gas flowing out from the tank to the supply pipe, the pressure detection unit being provided in the supply pipe, wherein:
the auxiliary machinery includes a main stop valve configured to control outflow of the fuel gas from the tank to the supply pipe by opening and closing under control of the control unit, the main stop valve being provided in the supply pipe;
the storage amount detection unit is configured to acquire, as the measured value, the pressure of the fuel gas detected by the pressure detection unit; and
the stop processing is processing of stopping the supply of the fuel gas to the fuel cell by closing the main stop valve when the pressure of the fuel gas acquired by the storage amount detection unit is less than a predetermined lower limit pressure, the predetermined lower limit pressure being the threshold value.

3. The fuel cell system according to claim 2, wherein the control unit is configured to execute, after executing the stop processing, confirmation processing of re-determining, for the number of predetermined times, whether to execute the stop processing by opening the main stop valve in response to an operation of a user and detecting the pressure of the fuel gas again by the pressure detection unit.

4. The fuel cell system according to claim 1, wherein the control unit is configured to, when the measured value detected by the storage amount detection unit is less than a predetermined allowable value greater than the threshold value after the connection processing, prohibit the operation of the fuel cell and electrically disconnect the secondary battery from the auxiliary machinery.

5. The fuel cell system according to claim 1, wherein the control unit is configured to, when the amount of power accumulated in the secondary battery is less than a predetermined threshold value of the amount of accumulated power, which is less than the lower limit amount of accumulated power, after the connection processing, prohibit the operation of the fuel cell and electrically disconnect the secondary battery from the auxiliary machinery again.

6. A method of controlling a fuel cell system, the fuel cell system including a fuel cell configured to generate power by receiving a supply of a fuel gas stored in a tank, and a secondary battery configured to supply power to auxiliary machinery used for an operation of the fuel cell, the method comprising:
detecting a measured value representing an amount of the fuel gas stored in the tank;
detecting an amount of power accumulated in the secondary battery;
determining if the measured value is less than a threshold value corresponding to a predetermined lower limit amount of the stored fuel gas, and if so executing stop processing of stopping the supply of the fuel gas to the fuel cell;
determining if the stop processing is executed and the amount of power accumulated in the secondary battery is less than a predetermined lower limit amount of accumulated power, and if so executing disconnection processing of electrically disconnecting the secondary battery from the auxiliary machinery; and
executing connection processing of electrically connecting the secondary battery to the auxiliary machinery after the disconnection processing is executed and a feeding of the fuel gas to the tank is detected.

* * * * *